United States Patent [19]

Grabow, Jr.

[11] Patent Number: 4,473,181

[45] Date of Patent: Sep. 25, 1984

[54] SOLDERING AND DESOLDERING IRON TIP FOR REMOVING SOLDERED ELEMENTS

[76] Inventor: William J. Grabow, Jr., 117 Delsea Dr., Westville, N.J. 08093

[21] Appl. No.: 411,442

[22] Filed: Aug. 25, 1982

[51] Int. Cl.³ .............................................. B23K 3/02
[52] U.S. Cl. ........................................ 228/51; 228/54
[58] Field of Search ............................ 228/19, 51, 54; 140/106; 81/3 R

[56] References Cited

U.S. PATENT DOCUMENTS

| | | | |
|---|---|---|---|
| 1,172,161 | 2/1916 | Moench | 228/19 |
| 2,512,426 | 6/1950 | Hartley | 228/140 |
| 3,662,152 | 5/1972 | Weller et al. | 228/54 |
| 4,167,056 | 9/1979 | Wattel | 225/103 |
| 4,257,159 | 3/1981 | Wingert | 140/106 |

FOREIGN PATENT DOCUMENTS 2349967 10/1975 Fed. Rep. of Germany ........ 228/51

OTHER PUBLICATIONS

Rapp, W. E., *Western Electric Technical Digest*, No. 55, Jul. 1979, p. 25, "Bifuracated Soldering Iron Tip".

*Primary Examiner*—Nicholas P. Godici
*Assistant Examiner*—P. Weston Musselman, Jr.
*Attorney, Agent, or Firm*—Edward R. Hyde

[57] ABSTRACT

An improved soldering iron tip having a slot for gripping the lead of an electrical component while heat is applied to desolder the lead. As the solder melts the component is removed by the gripping action of the slot as the iron is moved away from the joint.

3 Claims, 3 Drawing Figures

SOLDERING AND DESOLDERING IRON TIP FOR REMOVING SOLDERED ELEMENTS

BACKGROUND OF THE INVENTION

1. Field of the Invention

This invention relates to a method and device for desoldering soldering joints and more particularly for removing components having soldered leads.

2. Background of the Invention

It is quite conventional for electrical assemblies to be constructed of printed circuit boards with electrical components, having leads, on one side of the board and printed circuits on the opposite side. The leads from the components pass through holes, or apertures in the board and are solder-connected to appropriate locations of the printed circuit. It often occurs that it is desirable or necessary to remove components from a circuit board for replacement, repair or modification of the electrical assembly. This necessitates the desoldering of the leads, conventionally with a soldering iron, and lifting off the electrical component with tweezers or other gripping tool.

More particularly, during removal of the component, the circuit board is held in a jig or fixture and the operator cuts one of the leads as close to the component as possible. Then a soldering iron is applied to the solder joint of the cut lead and when the solder is melted the component is lifted up with a tweezer or needle-nozed pliers at the melted end. Then the soldering iron is applied to the other lead after it is cut and the second solder joint melted and the component lifted off with tweezers or needle-nozed pliers. The desoldering with the iron and lifting off requires the two hands of the operator and constitutes sequential steps.

It would be desirable and efficient to provide a tool that would perform both the desoldering and lifting-off steps.

SUMMARY OF THE INVENTION

Accordingly, it is an object of this invention to provide a tool that will serve to desolder a solder joint and also lift the desoldered element away from the joint.

A further object of the invention is to provide a tool that an operator can use with one hand to both desolder a soldered joint and lift the desoldered element.

A further object of the invention is to provide a tool that is simple and efficient in desoldering a soldered joint and moving the desoldered element away from the desoldered joint.

A still further object of the invention is to provide a new and improved method of desoldering a soldering joint and removing the desoldered element away from the joint.

The novel tool of the invention consists of a soldering iron tip which is flatened or chisel-ended and having a slot cut therein of a width sufficiently wide to receive the lead from an electrical component to be unsoldered.

In operation the operator will slide the slotted tip over the component lead close to the solder joint. After the solder melts, the tool is twisted slightly to grip the lead in the slot and the component is lifted upward. Thus with one hand the operator, holding the tool is able to perform the steps of unsoldering, gripping and lifting. The component is then readily removed from the tip by wiping it on a cleaning sponge.

BRIEF DESCRIPTION OF THE DRAWINGS

These and other objects of the invention will become apparent with reference to the following specification and to the drawings wherein.

DETAILED DESCRIPTION

Figure 1:
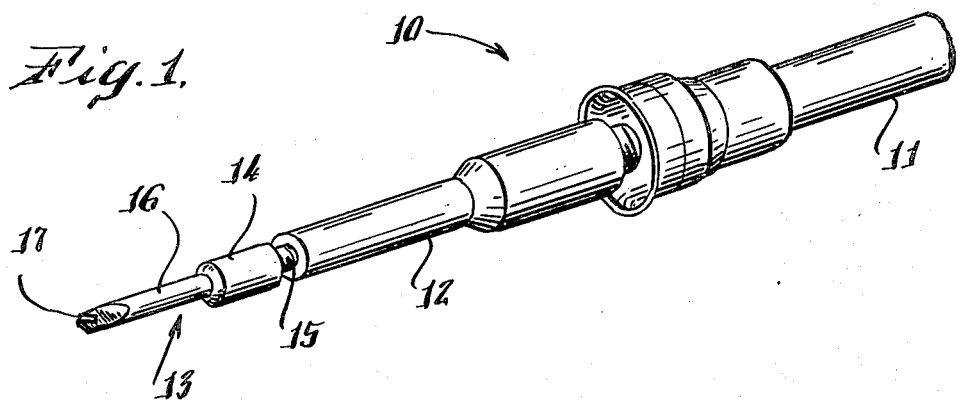
FIG. 1 is a perspective view of a soldering iron with the desoldering tip of the present invention.
Figure 2:
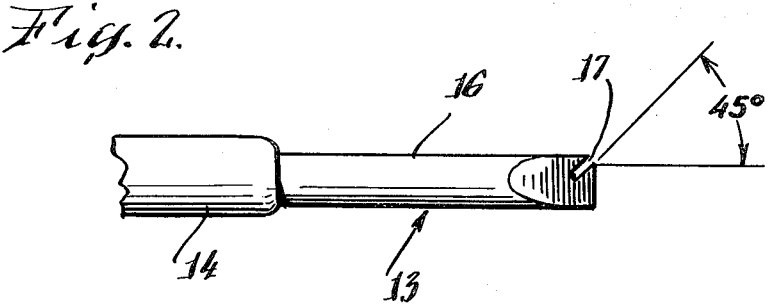
FIG. 2 is a plan view of the end of the soldering iron of FIG. 1 showing the chisel-end slotted tip of the present invention.

Referring now to the drawings and particularly to FIG. 1, there is illustrated a soldering iron 10 comprising a conventional hand-held portion 11, a shank extension 12 and a tip 13 screw threaded to the shank extension.

The tip comprises an enlarged portion 14 having an internally threaded opening to receive the screw-threaded end 15 of shank extension 12 for a convenient removal and replacement of tips. A reduced portion 16 of the tip is flattened to form a chisel-shaped end. The structure described so far is known in the art. The unique feature of the present invention is the slot 17 cut in the end of the chisel tip. In the embodiment herein described, the slot is cut starting at the end of one side of the chisel end and extending back at an angle of approximately 45° with the longitudinal axis of the tip and soldering iron shank. The width of the slot must be sufficient to receive the leads of the electrical components it is intended to desolder.

Figure 3:
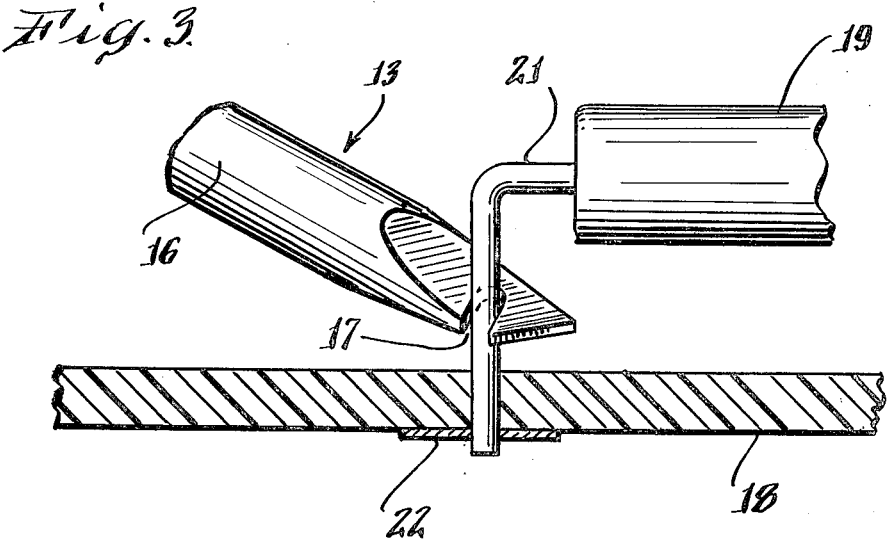
FIG. 3 is a view of the invention applied to an electrical component being desoldered.

Referring now more particularly to FIG. 3, there is shown a portion of a printed circuit board 18 having an electrical component 19 mounted thereon. There is shown one end of the component with an electrical lead 21 passing through the board 18 and soldered on at 22 to the printed circuit on the underside of the board.

When it is desired to remove the component 19, the tip 13 is brought into contact with the lead 21 by engaging the lead in the slot 17 which is of such a width to conveniently receive the lead. The heated iron tip 17 melts the solder 22 to release the lead. A slight twisting of the soldering iron or turning movement results in the lead being gripped by the sides of the slot 17. The operator simply then lifts up the soldering iron and removes the lead and component from the circuit board.

The tip 13 is preferably composed of iron clad copper. The characteristics of copper are well known and especially suitable for a soldering iron. The iron coating over the copper serves to inhibit oxidation and corrosion of the copper. When the slot 17 is cut in the copper it is important that the internal surfaces of the slot are also coated with a corrosive resistant material such as an iron clading similar to the coating on the tip body.

It is seen from the above description that in improved desoldering iron and method of removing electrical components from circuit boards has been described wherein the operator, using only the hand is able to desolder and remove the component.

Although the invention has been described with respect to a specific embodiment thereof, it is understood that other embodiments and modifications can be made within the scope of the appended claims.

What is claimed is:

1. A soldering and desoldering iron for applying heat to soldered lead wires of an electrical component soldered to an electric circuit board to disconnect the lead wire from the soldered connection comprising:

(a) a soldering iron tip;

(b) said tip having a slot formed therein of a width sufficient to receive the electrical component lead;

(c) said tip having flattened opposite sides in which the slot is located;

(d) the axis of said slot being at an acute angle of approximately 45° with the longitudinal axis of said soldering iron tip;

(e) said slot having parallel sides and being of substantially equal width and unobstructed throughout its length; and (f) said slot extending to and terminating at approximately one outer corner of said flattened tip.

2. The soldering and desoldering iron described in claim 1 in which the tip is made of copper having a ferrous coating to prevent wear and corrosion of the copper.

3. The soldering and desoldering iron defined in claim 1 or 2 in which said slot extends inward to substantially the longitudinal axis of the soldering and desoldering iron.

* * * * *